No. 755,762. Patented March 29, 1904.

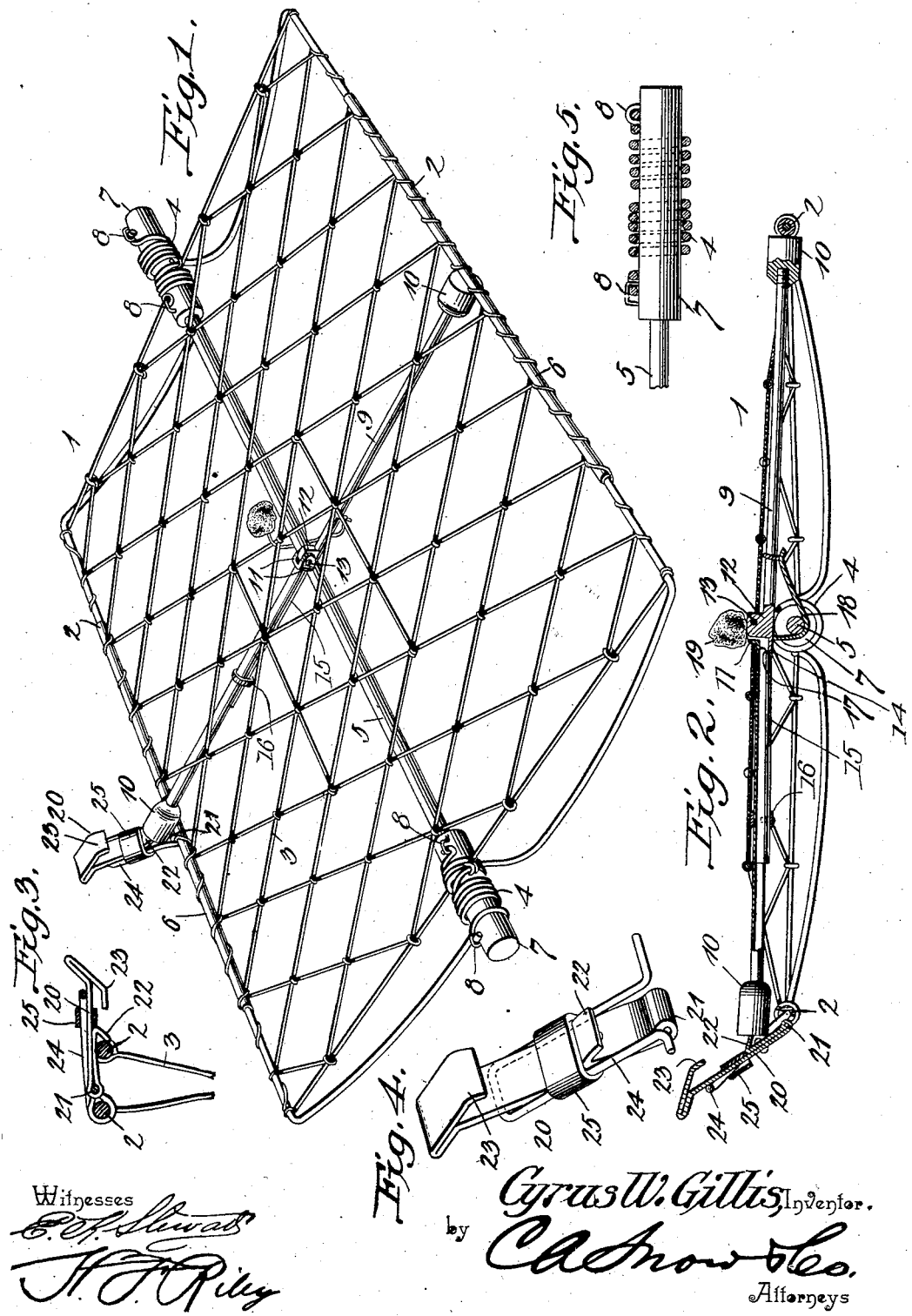

UNITED STATES PATENT OFFICE.

CYRUS W. GILLIS, OF ANDALUSIA, ALABAMA.

BIRD-TRAP.

SPECIFICATION forming part of Letters Patent No. 755,762, dated March 29, 1904.

Application filed September 23, 1902. Serial No. 124,580. (No model.)

*To all whom it may concern:*

Be it known that I, CYRUS W. GILLIS, a citizen of the United States, residing at Andalusia, in the county of Covington and State of Alabama, have invented a new and useful Bird-Trap, of which the following is a specification.

The invention relates to improvements in traps.

The object of the present invention is to improve the construction of traps and to provide a simple, inexpensive, and efficient one designed for catching chicken-hawks, other birds of prey, and the like and capable of being readily arranged over live or other bait and of being sprung when a hawk or other animal makes a strike.

A further object of the invention is to provide a trap of this character having a trigger capable of adjustment to provide the desired degree of sensitiveness.

The invention consists in the construction and novel combination and arrangement of parts hereinafter fully described, illustrated in the accompanying drawings, and pointed out in the claims hereto appended.

In the drawings, Figure 1 is a perspective view of a trap constructed in accordance with this invention and shown set. Fig. 2 is a sectional view of the same, taken longitudinally of the trigger. Fig. 3 is a detail sectional view illustrating the manner of locking the sides or sections of the trap in their closed position when the trap is sprung. Fig. 4 is a detail perspective view of the catch. Fig. 5 is a detail view illustrating the manner of mounting the springs on the ends of the pintle-rod.

Like numerals of reference designate corresponding parts in all the figures of the drawings.

1 designates a trap composed of two hinged frames or sides 2, connected at their outer edges with a sheet of netting 3, which forms the body of the trap and which is adapted to be arranged as shown in Fig. 1 when the trap is set. The netting is constructed of flexible material and is adapted to fold when the trap is sprung and the outer edges of the sides are brought together, as illustrated in Fig. 3 of the drawings. Each side or frame of the trap is constructed of a piece of spring-wire or other suitable material, such as rod metal, which is bent into approximately rectangular form and which has its terminals coiled to form springs 4, which are arranged on the ends of a pintle-rod 5. The outer edges or portions of the frames may be reinforced by rods or pieces 6, and the netting may be secured to the sides or frames in any desired manner. The pintle-rod, which extends across the trap and which may be constructed of any suitable material, is provided with enlarged ends 7, receiving the coils of the sides or frames and having the terminals thereof secured to them by suitable fastening devices, as clearly shown at 8 in Figs. 1 and 5 of the drawings. The springs formed by the coils of the sides or frames are placed under tension when the said sides or frames are opened to the position illustrated in Fig. 1 of the drawings and are adapted to close the sides or frames quickly when the trap is sprung, as hereinafter explained.

The trap is set by means of a trigger 9, composed of two sections or members hinged together at their adjacent ends and provided at their outer ends with enlargements or heads 10 for engaging the sides or frames of the trap. One of the sections or members of the trigger is provided with a pair of perforated ears 11, and the other section or member has a perforated lug 12 arranged between the ears and secured to the same by a pivot 13. The lug is located near the inner end 14 of one section, and the end 14, which projects beyond the pivot, is arranged to engage an adjustable slide 15, mounted in a suitable guide 16 and having a tapered end 17, adapted to be arranged to be engaged by the projecting portion 14 to limit the pivotal movement of the sections, whereby the trap is rendered as sensitive as desired and is enabled to resist the desired amount of pressure. When the trap is set, as illustrated in Fig. 2, the members or sections of the trigger are arranged substantially in alinement, the pivotal point being slightly above the center and being adapted to be swung downward to spring the trap, and the said trigger is arranged to fold or close with the hinged sides or members of the trap. The netting may be arranged above or below the trigger, and the slide is adapted to be adjusted to permit the trigger to sustain the weight of the netting without causing the trap to be sprung accidentally. A bait-cord 18, which has one end attached to one of the sections or members of the trigger, is passed beneath the pintle-rod and is provided at its other end with a suitable bait 19, which is designed to be located above the net. Any attempt to pull the bait upward or outward will operate to swing the joint of the trigger downward and spring the trap. Live bait or decoys may be placed beneath the net for attracting chicken-hawks and other birds of prey, and any attempt to strike the bait will operate to force the net and the trigger downward, and thereby spring the trap.

The trap is locked in its closed position to prevent a captive animal from escaping by means of a catch 20, consisting of a single piece of sheet metal or other suitable material doubled to form an eye 21 and having its terminals bent to form inner and outer hooks 22 and 23. The metal of the catch is doubled between the center and one side, and the shorter side, which is riveted or otherwise secured to the longer side, is bent to form the inner hook 22, and the longer side is bent to form the outer hook 23. The catch, which may be constructed of any other desired material, is connected with one side or frame of the trap by means of a wire passing through the eye 21, and the said catch is also supported by a loop 24, preferably formed by bending the resilient material of the side or frame outward; but it may be constructed in any other desired manner. The loop, which is oblong, receives a catch and terminates short of the outer end of the same, and its outer transverse portion is arranged on the exterior of the catch to support the same. The catch is secured to the loop by means of a band 25, embracing both the catch and the band and arranged between the inner and outer hooks. In setting the trap one end of the trigger is preferably placed against the inner hook and the other end is engaged with the outer edge of the other side or frame, and when the trap is sprung the trigger drops from the sides or frames and the catch operates to lock the same in their closed position. One or the other of the hooks will engage the other side or frame of the trap and will firmly hold the same against outward movement, so that the captured bird or animal will be effectually prevented from opening the trap and escaping.

It will be seen that the trap is exceedingly simple and inexpensive in construction, that it possesses great strength and durability, and that it is adapted to be readily set. Furthermore, it will be clear that the trigger is adjustable to render the trap as sensitive as desired and that when the trap is sprung it is securely locked in its closed position.

What is claimed is—

1. A trap comprising two hinged sides, and a trigger composed of two pivoted members, one of the members being provided with an adjustable device for engaging the other member, to limit the pivotal movement, substantially as described.

2. A trap, comprising two spring-actuated sides, hinged together, and a trigger, composed of two members, pivotally connected, one of the members being extended inward beyond the pivot, and the other member being provided with an adjustable device for engaging the extended portion, substantially as described.

3. A trap, comprising two sides hinged together, and a trigger composed of two members pivoted together, one of said members being provided with an adjustable slide arranged to engage the other member, substantially as described.

4. A trap composed of two spring-actuated sides hinged together, means for setting the trap, and a catch mounted on one of the sides and provided with a plurality of engaging portions arranged at different points and adapted to engage the other side of the trap to lock the same, substantially as described.

5. A trap comprising two spring-actuated sides hinged together, means for setting the trap, a loop extending from one side, a catch connected with such side and arranged within the loop and provided with means for engaging the other side of the trap, and means for connecting the catch and the loop, substantially as described.

6. A trap comprising two spring-actuated sides, means for setting the trap, and a catch consisting of a single piece of material doubled to form an eye for connecting it to the trap, and having sides of different lengths, the terminals of the sides being bent to form inner and outer hooks, substantially as described.

In testimony that I claim the foregoing as my own I have hereto affixed my signature in the presence of two witnesses.

CYRUS W. GILLIS.

Witnesses:
W. G. PRYOR,
C. S. O'NEAL.